April 17, 1951 G. H. HOWE 2,549,468

MAGNETIC SOUND RECORDING MEDIUM

Original Filed Sept. 13, 1946

INVENTOR.
GOODWIN H. HOWE
BY [signature]
HIS ATTORNEY

Patented Apr. 17, 1951 2,549,468

UNITED STATES PATENT OFFICE 2,549,468

MAGNETIC SOUND RECORDING MEDIUM

Goodwin H. Howe, Schenectady, N. Y., assignor to General Electric Company, a corporation of New York Original application September 13, 1946, Serial No. 696,947. Divided and this application November 20, 1947, Serial No. 787,251

8 Claims. (Cl. 148—12)

This application is a division of my copending application Serial No. 696,947, filed September 13, 1946, now abandoned, and assigned to the same assignee as the present invention.

The present invention relates to an improved metallic medium for magnetically recording sound and to a process for producing such a medium.

Considerable advances have recently been made in the art of recording sound magnetically, more particularly in reproducing and recording instruments. As good recording and reproducing characteristics are equally dependent on satisfactory recording media, such advances have necessarily intensified efforts to provide a medium suitable for use in such improved equipments.

Where a recording medium consists of an elongated metallic member, as for example a wire or tape, it is considered that the characteristics of primary importance are good frequency response, low noise level, adequate strength under operating conditions and non-corrodability.

It is an object of the present invention to provide a sound recording medium which possesses the foregoing qualities in an outstanding degree.

In this connection materials of the austenitic stainless steel type provide certain advantages with respect to strength and corrosion resistance which would make them particularly desirable for a recording medium. Heretofore such steels have generally been considered as not suitable to applications dependent upon permanent magnet characteristics because austenite which is the basic structural element of the steels is non-magnetic. However, I have found that where certain such steels are mechanically worked in a particular manner and aged by heat treatment to precipitate carbides the permanent magnet properties of the steel are greatly enhanced without any substantial reduction of strength and corrosion resistance and that they have an unusual combination of properties favorable to magnetic recording applications.

The media and process for making the same which I desire to protect herein are specified with particularity in the appended claims and are described in the following specification. The drawings comprise three photomicrographs illustrating a steel sample in successive stages of treatment in accordance with my invention and a graph illustrating the improved recording characteristics which I obtain.

In accordance with one aspect of my invention an exceptional combination of strength, corrosion resistance and magnetic properties for recording purposes is obtained by subjecting austenitic stainless steel to mechanical working to produce an elongated crystalline structure and an aging or carbide precipitation treatment to cause a uniformly fine distribution of the precipitated carbides therein. A treatment such as I have just dscribed induces a separation of the ferrite from the austenite enhancing the strength of the steel and causes a precipitation of the carbides which imparts permanent magnet properties to the steel suitable for magnetic recording applications.

More specifically, I prefer to start with a softened or annealed austenitic stainless steel of the type commonly known as 18–8 stainless steel having a composition of substantially 17–20% chromium, 7–10% nickel, .03–.25% carbon, minor quantities of impurities usually present in such steels and with or without such modifying elements as columbium, titanium, vanadium, or nitrogen added in a manner well known in the art and the balance substantially all iron. As a first step, I severely cold work the selected steel until the cross sectional area has been reduced to a small fraction of the original value. Cold working the steel in this manner causes a breaking up of the normal crystalline structure of the austenite and obtains an elongated structure of austenite and ferrite. After a severe cold working such as I have just described, the steel is aged at a temperature preferably in the range of 500° C. to 700° C. and for a period of time varying from less than one second to about two hours and depending upon the manner in which the steel is aged.

The amount of cold work necessary to produce a structure suitable for aging will depend upon the final properties desired in the steel. Where optimum recording characteristics are essential and where some strength may be sacrificed, the steel may be cold reduced directly to its final dimension and then subjected to an aging treatment. Where the greatest possible strength is considered essential this may be realized without unduly reducing the recording characteristics through cold reducing the steel to within a few per cent of the final dimension, aging, and finally cold working it to the desired final size.

Moreover, the temperature and time of the aging treatment will vary with the manner in which the steel is processed. Where the steel is aged in bulk quantities, as for example, by batch aging, the furnace temperature and total time at temperature will be determined by the size of the batch. Where the steel is processed in a continuous sequence of steps including aging, the steel is passed continuously through the hot zone of a furnace, and the energy required to uniformly heat the steel to the desired temperature will vary with the rate at which the steel passes through the hot zone. A wire or strand which has been aged in this manner is commonly designated as strand aged. Aging the steel in this manner causes a precipitation of the metal carbides such as chromium carbide and where the steel contains modifying elements such as columbium, titanium, or vanadium a precipitation of the carbides of these elements is also effected. The resulting metallurgical structure has permanent magnet characteristics particularly suitable in a magnetic recorder, such as good frequency response and a low noise level.

Particularly good results are obtained by utilizing a softened or annealed austenitic stainless steel of the 18-8 type having a composition in the range of 18-20% chromium, 8-10% nickel, .08% carbon maximum, and the balance substantially all iron except for incidental impurities. Starting with a softened wire of at least .030'' diameter, I prefer as a first step to cold draw the wire to a diameter of from 10-50% of the original diameter. After such a cold reduction, a heat treatment at a temperature of from 500° to 700° C. for a period of time sufficient to precipitate the carbides, as above explained, is recommended.

Excellent results have been obtained using .020 inch mill-drawn softened austenitic stainless steel wire of a type commonly known in the trade as 304 stainless and having a composition of 18.9% chromium, 8.98% nickel, .065% carbon up to 2% maximum manganese, up to 1% maximum silicon and the balance iron except for incidental impurities. In this case optimum properties were obtained by an initial working step which reduced the cross sectional area of the wire by about 96% (i. e. to .004 inch or final size) and thereafter strand aging by passing the wire through a uniformly heated 24 inch hot zone of a furnace operating at 625±10° C. at a rate of 20-60 ft./minute. Similar properties have been realized when a .020 inch diameter mill-drawn softened austenitic stainless steel wire of the same composition was reduced in cross sectional area by about 95% (i. e. to .0045 inch) batch aged at a temperature of 575° for about 10 minutes and then cold drawn about 21% to final size or .004 inch in diameter. In other instances where I have batch aged wire I have used temperatures up to 625° C. and for periods of time up to 30 minutes with successful results. Hereinabove, I have indicated that the amount of initial cold work, aging temperatures and times at temperature are to some extent determined by the particular properties desired. In this connection I have found that in a .004 inch diameter wire cold reduced from .020 inch in diameter, greater breaking strength is obtained by an initial cold reduction step of about 94 to 95%, to .005 or .0045 inch aging and finally cold reducing the cross sectional area of the wire by 36 to 21% respectively to .004 inch.

Recording and reproducing media in the form of wire processed in accordance with the treatments described in the preceding paragraph is characterized by good frequency response, high undistorted signal-to-noise ratio, a breaking strength of about 325,000 p. s. i. and an improvement in permanent magnet characteristics for recording media illustrated by the following table where peak B is induction, Br is residual induction and Hc is coercive force.

| | Peak B | Br | Hc |
|---|---|---|---|
| Mill-drawn wire | 10,280 | 7,575 | 70 |
| Wire Mill-drawn and aged | 3,175 | 2,350 | 188 |

It is further characterized by a mechanical rigidity which imparts to the wire a tendency to assume a straight line in space rather than the usual spiral cast normally associated with cold drawn wire.

Although the aging treatment which I have described as a part of the above-mentioned process is normally carried on in a protective atmosphere, as for example hydrogen, to maintain the bright surface characteristic of the stainless steels, I have also found that I can carry on the aging treatment in an atmosphere of air. Where aging is in an atmosphere of air substantially the same recording and strength characteristics are obtained but the surface is heat tinted to a distinctive and attractive color varying from a straw to a dark blue, the color being dependent upon the degree of oxidation of the surface. This surface coloring is considered desirable in the commercial application of the treatment above-described, and therefore represents a useful modification of the invention.

To develop slightly better strength characteristics I have found that it is desirable in some cases to interpose a strain relieving treatment after the wire has been cold worked to nearly the aging stage. The strain relieving treatment which I prefer comprises heating the steel at a temperature of about 400° to 450° for about one hour after the steel has been drawn to a reduction in cross sectional area of about 93%. After this strain relieving treatment the wire is cold drawn to within about 21% of its final cross section area, aged by heating as previously described and finally cold reduced to final size.

Figs. 1, 2 and 3 of the drawing illustrate photomicrographically the effects obtained by cold drawing a steel to final size and subjecting the same material to an aging treatment such as I have described.

Figure 1:
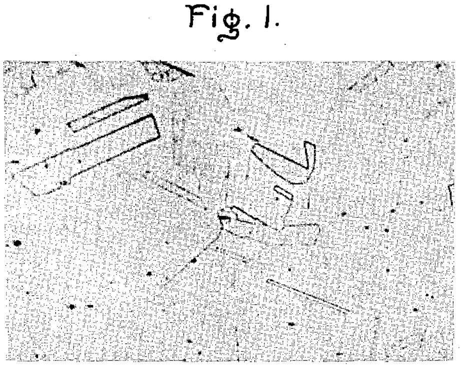
Figure 1 illustrates the typical structure of .020'' diameter austenitic stainless steel wire softened by annealing at a temperature of 1075-1100° C. and rapidly cooled therefrom.
diameter to .004'' in diameter.
Figure 2:
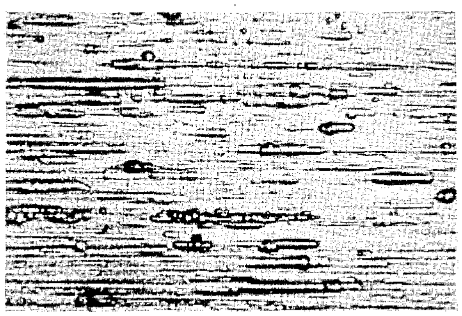
Figure 2 illustrates the structure of the same steel after it has been cold drawn from .020'' in diameter to .004'' in diameter.
Figure 3:
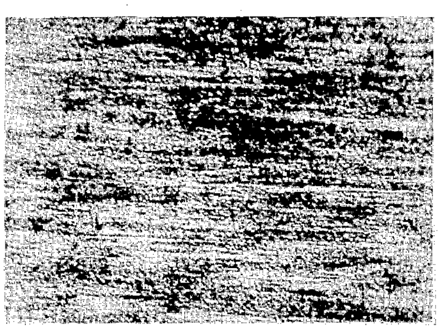
Figure 3 illustrates the structure of the same steel after it has been further treated by strand aging at a temperature of 625° C. for about 1 second.
Figure 4:
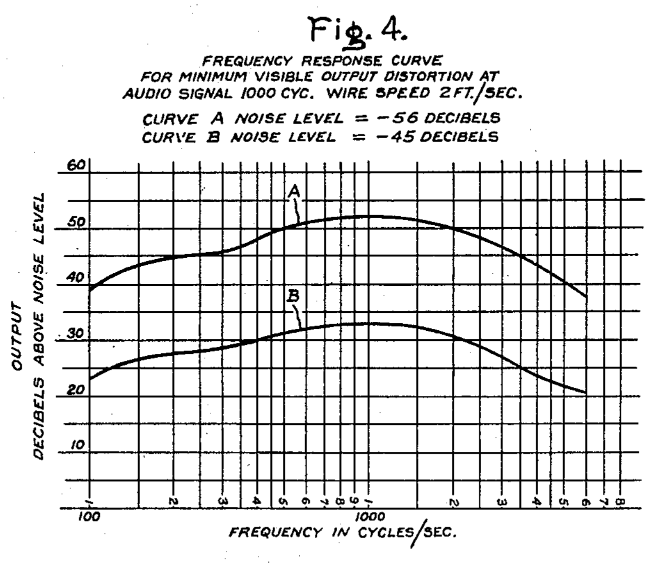
Figure 4 is a graph illustrating by curves A and B the degree of improvement in output over a range of frequencies imparted to cold drawn .004'' diameter wire treated in accordance with my invention as compared with an untreated cold drawn .004'' diameter wire of the same composition.

A recording medium produced in accordance with my invention will find particularly useful application in sound recording and reproducing apparatus where the quality of recording and reproduction is dependent upon good magnetic characteristics of the recording medium and uninterrupted operation is dependent upon high strength and freedom from corrosion.

Although my process has been disclosed in specific examples herein above as being applied to metal wire, it is not limited to such material since it is equally effective in the treatment of other metallic forms such as stainless steel tape or strip to improve magnetic recording characteristics.

What I claim as new and desire to secure by Letters Patent of the United States is:

1. The method of preparing a stainless steel magnetic recording wire having good magnetic sound recording properties, which method comprises mechanically working a softened austenitic stainless steel wire containing 17–20 percent chromium, 7–10 percent nickel, and 0.03 to 0.25 percent carbon by a cold drawing process to reduce its cross-sectional area by at least about 94 percent to a diameter of about 4 mils thereby to produce an elongated crystalline structure in said steel and aging the work wire at a temperature between 500° C. and 700° C. for a period sufficient to bring the wire to temperature and cause a precipitation of carbides present in said steel.

2. The method of preparing a stainless steel magnetic recording wire from a softened wire of austenitic stainless steel containing 17–20 percent chromium, 7–10 percent nickel, and 0.03 to 0.08 percent carbon which method comprises cold drawing said wire to reduce the cross-sectional area thereof by about 94–95% and to obtain a wire of a diameter of approximately 0.0045 to 0.005 inch having an elongated crystalline structure, heating the drawn wire at a temperature between about 500° C. and 700° C. for a time sufficient to cause the precipitation of carbides present in said steel, and further cold drawing the resulting wire to a diameter of about 0.004 inch.

3. The method of preparing a stainless steel magnetic recording wire which comprises heating a 20 mil austenitic stainless steel wire containing 17 to 20 percent chromium, 7 to 10 percent nickel and 0.03 to 0.25 percent carbon to a temperature of from 1075–1100° C. to soften said wire, cold drawing said wire to reduce the cross-sectional area thereof by from about 94 to 96 percent to a diameter of about 4 mils and aging the cold drawn wire at a temperature of from 575° to 700° C. for a time sufficient to cause a precipitation of carbides therein.

4. The method of claim 3 wherein the wire is aged at a temperature of about 625° C.

5. The method of claim 4 wherein the wire has a composition of about 18.9 percent chromium, 9 percent nickel, 0.065 percent carbon, up to 2 percent manganese, up to 1 percent silicon, balance iron except for minor impurities, and the aging treatment consists of a heat treatment at about 575° C. for about 10 minutes.

6. The method of preparing a stainless steel magnetic recording wire which comprises subjecting an austenitic stainless steel wire containing from 18 to 20 percent chromium, 8 to 10 percent nickel, and 0.03 to 0.08 percent carbon to a softening heat treatment, reducing the cross-sectional area of said wire by from 94 to 95 percent by cold drawing to a diameter of from 0.0045 to 0.005 inch, aging the cold drawn wire at a temperature of about 575° C. to precipitate carbides therein and thereafter cold drawing the aged wire to a diameter of about 4 mils.

7. The method of preparing a stainless steel magnetic recording wire which comprises cold working a softened 0.020 inch diameter austenitic stainless steel wire containing about 18.9 percent chromium, 9 percent nickel, 0.065 percent carbon, up to 2 percent manganese, and up to 1 per cent silicon, balance iron except for incidental impurities by cold drawing said softened wire to a diameter of 0.004 inch and aging the drawn wire at a temperature of about 625° C. for a period up to 30 minutes to obtain a precipitation of carbides therein.

8. A cold worked and heat treated stainless steel magnetic recording wire of a diameter of about 4 mils and being characterized by a uniformly fine distribution of precipitated carbides throughout the steel, said wire having a high tensile strength and good frequency response and possessing sound recording and reproducing properties of a high signal-to-noise ratio which is about 15 decibels higher than a similarly cold worked wire of the same composition which has not been heat treated to precipitate the carbides, said wire being obtained by cold drawing a softened stainless steel wire containing 17 to 20 percent chromium, 7 to 10 percent nickel and 0.03 to 0.25 percent carbon to reduce the cross-sectional area thereof by at least 94 percent to a diameter of about 4 mils and aging the cold drawn wire at a temperature between 500° C. and 700° C. for a period sufficient to cause a precipitation of the carbides present in said steel.

GOODWIN H. HOWE.

REFERENCES CITED

The following references are of record in the file of this patent:

UNITED STATES PATENTS

| Number | Name | Date |
|---|---|---|
| 2,044,743 | Bain et al. | June 16, 1936 |
| 2,080,367 | Pfield | May 11, 1937 |
| 2,489,520 | Camras et al. | Nov. 29, 1949 |

FOREIGN PATENTS

| Number | Country | Date |
|---|---|---|
| 875,148 | France | Sept. 7, 1942 |

OTHER REFERENCES

"Alloys of Iron and Chromium," vol. 2, by Kinzel and Franks, pages 338–340, published by McGraw-Hill Co., N. Y., 1940, 1st edition.